(12) United States Patent
Wolf, II

(10) Patent No.: US 9,979,425 B2
(45) Date of Patent: May 22, 2018

(54) CELLULAR TELEPHONE SHIELD FOR THE REDUCTION OF ELECTROMAGNETIC RADIATION EXPOSURE

(75) Inventor: Erich W. Wolf, II, Lake Charles, LA (US)

(73) Assignee: Stephen Carmody, San Francisco, CA (US)

( * ) Notice: Subject to any disclaimer, the term of this patent is extended or adjusted under 35 U.S.C. 154(b) by 1510 days.

(21) Appl. No.: 13/566,343

(22) Filed: Aug. 3, 2012

(65) Prior Publication Data

US 2013/0035142 A1 Feb. 7, 2013

Related U.S. Application Data

(60) Provisional application No. 61/574,444, filed on Aug. 3, 2011.

(51) Int. Cl.
| | |
|---|---|
| B32B 3/26 | (2006.01) |
| B32B 15/00 | (2006.01) |
| B32B 27/36 | (2006.01) |
| C09J 7/29 | (2018.01) |
| C09J 7/38 | (2018.01) |
| C09J 183/04 | (2006.01) |
| H04B 1/3827 | (2015.01) |
| B32B 27/00 | (2006.01) |

(52) U.S. Cl.
CPC .......... *H04B 1/3838* (2013.01); *B32B 3/266* (2013.01); *C09J 7/29* (2018.01); *B32B 15/00* (2013.01); *B32B 27/00* (2013.01); *B32B 27/36* (2013.01); *B32B 2250/04* (2013.01); *B32B 2307/212* (2013.01); *C09J 7/38* (2018.01); *C09J 183/04* (2013.01); *C09J 2465/006* (2013.01); *C09J 2483/00* (2013.01); *Y10T 428/2848* (2015.01)

(58) Field of Classification Search
None
See application file for complete search history.

(56) References Cited

U.S. PATENT DOCUMENTS

| | | |
|---|---|---|
| 5,336,896 A | 8/1994 | Katz |
| 5,444,866 A | 8/1995 | Cykiert |
| 5,550,552 A | 8/1996 | Oxley |
| 5,613,221 A | 3/1997 | Hunt |
| 5,657,386 A | 8/1997 | Schwanke |

(Continued)

FOREIGN PATENT DOCUMENTS

| | | |
|---|---|---|
| JP | 2004072051 | 3/2004 |
| JP | 2005002532 | 1/2005 |

(Continued)

*Primary Examiner* — Frank D Ducheneaux
(74) *Attorney, Agent, or Firm* — Schultz & Associates, P.C.

(57) ABSTRACT

A radiation shield comprises a substrate polymer layer, a conductive layer having an aperture providing access to a front face of a cellular telephone, adjacent the substrate polymer layer, and an adhesion surface adjacent the conductive layer and the front face. A radiation shield comprising a first substrate polymer layer, a conductive layer having an aperture providing access to a touch-sensitive screen of the front face, adjacent the first substrate polymer layer, a second substrate polymer layer adjacent the conductive layer, and an adhesion surface adjacent the conductive layer and the front face. At least one opening provides access to the front face.

13 Claims, 8 Drawing Sheets

(56) References Cited

U.S. PATENT DOCUMENTS

| | | |
|---|---|---|
| 5,731,963 A | 3/1998 | Heiss et al. |
| 5,826,201 A | 10/1998 | Gratias |
| 6,075,977 A | 6/2000 | Bayrami |
| 6,437,755 B1 | 8/2002 | Joshi |
| 7,242,507 B2 | 7/2007 | Yen |
| 7,697,304 B2 * | 4/2010 | Naito ............... H05K 9/0096 361/749 |
| 2002/0009976 A1 | 1/2002 | Rashidi |
| 2002/0175099 A1 | 11/2002 | Wu |
| 2004/0198264 A1 | 10/2004 | Saur et al. |
| 2008/0176973 A1 * | 7/2008 | Qiu ....................... B32B 7/02 523/135 |

FOREIGN PATENT DOCUMENTS

| | | |
|---|---|---|
| WO | 9531048 | 11/1995 |
| WO | 2004028008 | 4/2004 |
| WO | 2008044414 | 4/2008 |
| WO | 20100115159 | 10/2010 |

* cited by examiner

CELLULAR TELEPHONE SHIELD FOR THE REDUCTION OF ELECTROMAGNETIC RADIATION EXPOSURE

CROSS REFERENCE TO RELATED APPLICATION

This application claims priority to U.S. Provisional Application No. 61/574,444 filed on Aug. 3, 2011.

FIELD OF THE INVENTION

The field of the invention relates to cellular telephones. In particular, the invention relates to the shielding of electromagnetic radiation produced by cellular telephones.

BACKGROUND OF THE INVENTION

Wireless devices such as cellular telephones are designed to emit electromagnetic radiation during use. Repetitive use of these devices, especially in close proximity to the human body, has been postulated to impart relatively high levels of cumulative radiation. High levels of exposure have been shown to pose a potential health risk and an increased risk of certain types of cancers in humans. Increased cancer risk is of a particular concern, considering the use of cellular telephones typically occurs close to the head and brain.

When electromagnetic waves are absorbed by an object, the energy of the waves is converted to heat. Electromagnetic waves can also be reflected or scattered, in which case their energy is redirected or redistributed. The quantity of radiant energy absorbed transmitted may be calculated by integrating radiant flux (or power) with respect to time.

Instantaneous electrical power P is given by $$P(t) = I(t) \cdot V(t) \quad [1]$$

where
P(t) is the instantaneous power, measured in watts (joules per second)
V(t) is the potential difference (or voltage drop) across the component, measured in volts
I(t) is the current through it, measured in amperes.

In the case of a periodic signal s(t) of period T, like a train of identical pulses, the instantaneous power $p(t)=|s(t)|^2$ is also a periodic function of period T. The peak power is defined by:

$$P_0 = \max[p(t)]. \quad [2]$$

The peak power is not always readily measurable, therefore, and the average power is more commonly used as a measure of delivered power. If energy per pulse is defined as:

$$\epsilon_{pulse} = \int_0^T p(t) dt \quad [3]$$

then the average power is defined as:

$$P_{avg} = \frac{1}{T} \int_0^T p(t) dt = \frac{\epsilon_{pulse}}{T}. \quad [4]$$

A notable fraction of the power from the electromagnetic radiation emitted by a cellular telephone when in use is absorbed by the human head. The electromagnetic radiation emitted by a GSM handset, for example, has a peak power of about 2 watts. Other digital mobile technologies, such as CDMA2000 and D-AMPS, have a peak power of about 1 watt.

The specific absorption rate ("SAR") is the rate at which energy is absorbed by the body when exposed to a radio frequency electromagnetic field. The SAR level is defined as the power of the electromagnetic radiation absorbed per mass of tissue in units of watts per kilogram (W/kg) and is averaged over a small sample volume. SAR maximum levels for cellular telephones have been set by governmental regulating agencies in many countries. In the United States, the Federal Communications Commission (FCC) has set a SAR limit of 1.6 W/kg, averaged over a volume of 1 gram of tissue, for the head. In Europe, the limit is 2 W/kg, averaged over a volume of 10 grams of tissue.

One well-understood effect of electromagnetic radiation is dielectric heating, in which any dielectric material (such as living tissue) is heated by rotations of polar molecules induced by the electromagnetic field. In the case of a person using a cellular telephone, most of the heating effect will occur at the surface of the head, causing its temperature to increase by a fraction of a degree. In this case, the level of temperature increase is an order of magnitude less than that obtained during the exposure of the head to direct sunlight. The brain's blood circulation is capable of disposing of excess heat by increasing local blood flow. However, other areas of the body, such as the cornea of the eye, do not have this temperature regulation mechanism. Exposure of 2-3 hours duration has been reported to produce cataracts in rabbits' eyes at SAR values from 100-140 W/kg, which produced lenticular temperatures of 41° C.

Other "non-thermal" effects are less well understood. For example, thermoreceptor molecules in cells activate a variety of secondary and tertiary messenger systems, in order to defend the cell against metabolic cell stress caused by heat. The increases in temperature that cause these changes are too small to be detected by current studies. Further, the communications protocols used by mobile phones often result in low-frequency pulsing of the carrier signal. Whether these modulations have biological significance has been subject to debate.

A study published in 2011 by The Journal of the American Medical Association conducted using fluorodeoxyglucose injections and positron emission tomography concluded that exposure to radiofrequency signal waves within parts of the brain closest to the cellular telephone antenna resulted in increased levels of glucose metabolism, but the clinical significance of this finding is unknown.

Despite differing opinions among researchers, evidence has accumulated that supports the existence of complex biological effects of weaker non-thermal electromagnetic fields, and modulated RF and microwave fields. The World Health Organization has classified radiofrequency electromagnetic radiation as a possible group 2b carcinogen. This group contains possible carcinogens with weaker evidence, at the same level as coffee and automobile exhaust.

At frequencies higher than radio frequencies (e.g., ultraviolet light), the biological effects of radiation are more pronounced. Radiation at these frequencies has sufficient energy (directly or indirectly) to damage biological molecules through ionization. All frequencies of UV radiation have been classed as Group I carcinogens by the World Health Organization. Ultraviolet radiation from sun exposure is the primary cause of skin cancer.

Thus, at UV frequencies and higher, electromagnetic radiation becomes ionizing and so does far more damage to biological systems than simple heating. "Ionization" produces ions and free radicals in materials (including living tissue) with very little heating, resulting in severe damage with little or no warning. Radiation in this frequency range is currently considered far more dangerous than the rest of the electromagnetic spectrum. But, it is postulated that low frequencies, perhaps as low as radio frequencies, can produce ionization effects, like those of X-rays, but at statistically less significant numbers. Over time, the cumulative effects of radio frequency radiation on living tissue may be significant enough to cause tissue damage.

Radiation exposure may be reduced by decreasing the duration of exposure or increasing the distance between the source of the radiation and the subject. Alternatively, increasing shielding between the radiation source and the subject will also reduce radiation exposure.

The prior art has attempted to provide electromagnetic shielding solutions for use with cellular telephones but has not been completely successful.

For example, U.S. Pat. No. 7,242,507 to Yen discloses an electromagnetic wave absorptive film. The film is comprised of a compound layer and a reflective layer. However, the film in Yen requires the embedding of absorbing grains into the compound layer leading to a complex manufacturing process. Further, the film cannot be used on cellular telephones having touch-sensitive screens.

U.S. Publication No. 2004/0198264 to Saur, et al. discloses a shielding that includes a flexible conductive sheet and an adhesive for attachment to a housing of a wireless telephone. However, the shielding apparatus disclosed in Saur cannot be used with cellular telephones having touch-sensitive screens.

PCT Publication No. WO 2010/115159 to Bradshaw, et al. discloses metal nanopowders for use as radiation shields. However, to be effective the nanoparticles and nanopowders in Bradshaw require two layers, a core and an outer layer. Further, the outer layer requires a group of several organic substituents, which require a complicated and labor intensive manufacturing process.

The prior art fails to disclose or suggest a radiation shield for a handheld cellular telephone having a simple construction and a wide range of uses including uses with touch-sensitive screens. Therefore, there is a need in the art for a radiation shield for cellular telephones such as cellular telephones that is easy to manufacture and adaptable for use on a wide range of cellular telephones, including devices with touch-sensitive screens.

SUMMARY

In one embodiment, a radiation shield for attachment to a cellular telephone having a front face and a set of controls comprises a substrate polymer layer, a conductive layer having an aperture, adjacent the substrate polymer layer, and an adhesion surface adjacent the conductive layer and the front face. The radiation shield has at least one opening providing access to the set of controls. The aperture provides access to the front face.

In another embodiment, the radiation shield comprises a first substrate polymer layer, a conductive layer having an aperture, adjacent the first substrate polymer layer, a second substrate polymer layer adjacent the conductive layer, and an adhesion surface adjacent the conductive layer and the front face. The radiation shield has at least one opening providing access to the set of controls. The aperture provides access to a touch-sensitive screen of the front face.

In another embodiment, a cellular telephone having a touch-sensitive screen comprises a base having a set of controls, a radiation shield having at least one opening providing access to the set of controls, adjacent the base, and a cover adjacent the radiation shield and attached to the base.

The radiation shield further comprises a first substrate polymer layer, a conductive layer having an aperture providing access to the touch-sensitive screen, adjacent the first substrate polymer layer, and a second substrate polymer layer adjacent the conductive layer. The radiation shield has at least one opening providing access to the set of controls. The aperture provides access to the touch-sensitive screen.

BRIEF DESCRIPTION OF THE DRAWINGS

The disclosed embodiments will be described with reference to the accompanying drawings.

DETAILED DESCRIPTION

Figure 1:
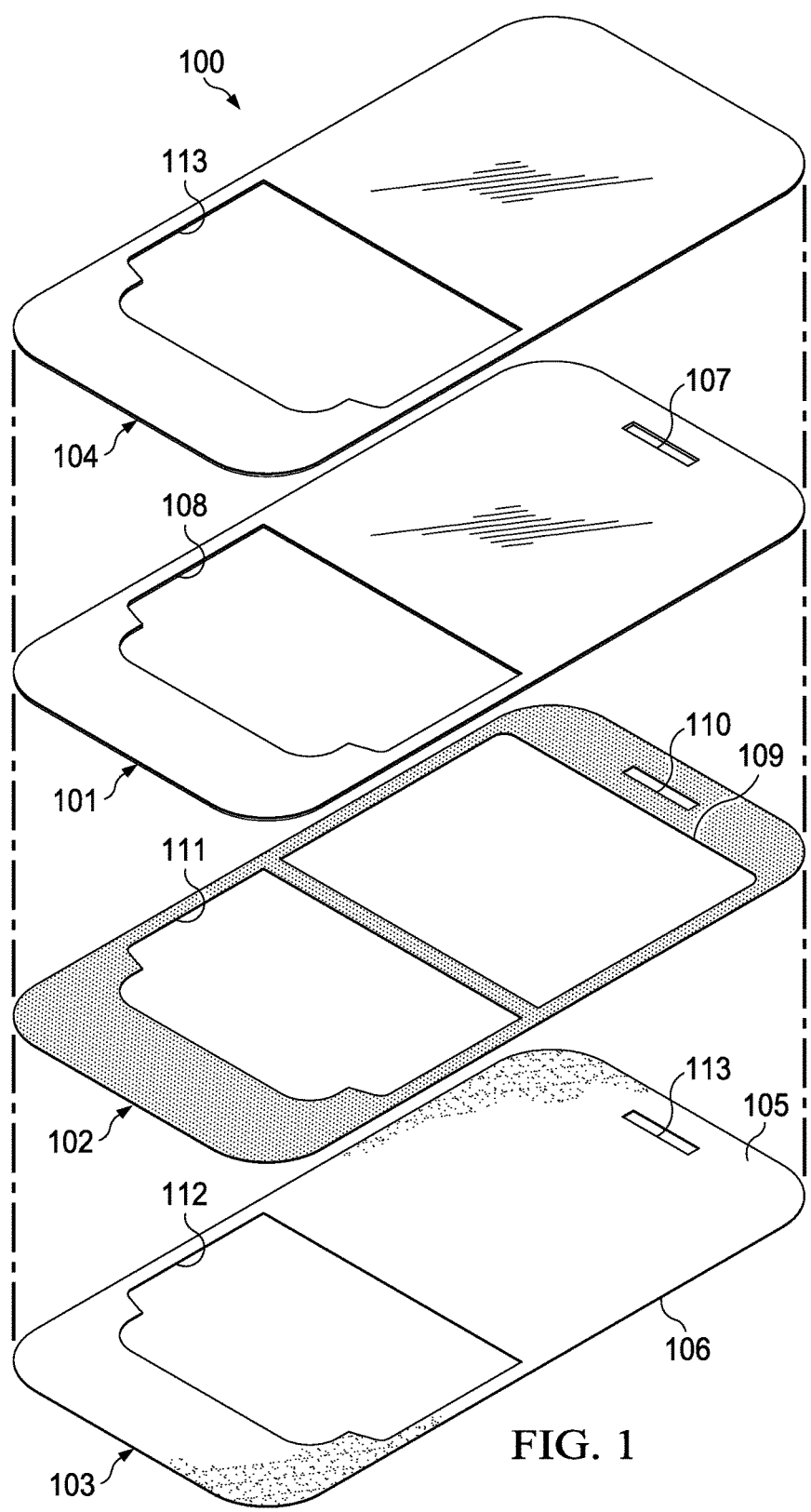
FIG. 1 is an exploded isometric view of a preferred embodiment.

Referring to FIG. 1, radiation shield 100 comprises a substrate polymer layer 101, a scratch resistant layer 104, conductive layer 102, and adhesive layer 103, polymer layer 101, opening 107, and opening 108. Conductive layer 102 has apertures 109, 110 and 111. Adhesive layer 103 has attachment surface 105, tack surface 106, opening 112, and opening 113.

In a preferred embodiment, substrate polymer layer 101 is comprised of a polyester substrate having a thickness of between about 0.01 mm and 0.02 mm.

In a preferred embodiment, substrate polymer layer 101 is comprised of polyethylene terephthalate ("PET") having a thickness of between about 0.5 mm and 1.0 mm.

In a preferred embodiment, substrate polymer layer 101 is a glass material having a thickness of between about 0.5 millimeters and 1.0 millimeters. Preferred glasses include 75% silica glass having non-metallic doping.

In another embodiment, substrate polymer layer 101 is comprised of a polycarbonate material having a thickness of between about 0.5 millimeters and 1.0 millimeters. Preferred polycarbonate materials are LEXAN®, MAKROKOM® or MAKROCLEAN® available from Sabic Innovative Plastics and Aria Plast AB of Sweden, respectively.

In a preferred embodiment, scratch resistant layer 104 is a scratch resistant material having a thickness of between about 0.01 millimeters and 0.02 millimeters. In a preferred embodiment, the scratch resistant surface is an acrylic coating or magnesium fluoride applied by spraying during manufacture.

In a preferred embodiment, conductive layer 102 is a metallic coating which is applied to the substrate polymer, having a thickness of between approximately 0.03 millimeters and 0.06 millimeters and a sheet resistance of between about 10 ohms per square and about 15 ohms per square. Preferred methods of manufacture include sputtering and vapor deposition of the metallic layer onto the substrate polymer. Apertures 109 and 111 do not have conductive layer 102. In a preferred embodiment, the substrate polymer is masked during application of the conductive layer to create apertures 109, 110 and 111. The apertures provide several functions. First, they allow the "touch-sensitive" screen of modern cellphones to function. Second, they provide sufficient visibility to all the cellular telephone display to be seen. Also, the partial metal coating remaining after etching provides additional electromagnetic shielding properties. In other embodiments, the conductive layer is removed after deposition by laser or chemical etching, particularly hydrochloric acid or nitric acid. Conductive layer 102 is preferably comprised of indium tin oxide having a transparency of at least 84% light transmission upon application. Other conductive materials such as silver, gold, and carbon nanotubes or graphene will also suffice. Conductive polymers can also be used with success, such as polyacetylene, polyphenylenen vinylene, polythophene and polyphylene sulfide. Similarly, conducting polymer nanofibers can be used with success, particularly polyaniline nanofibers and carbon nanofibers.

In a preferred embodiment, adhesive layer 103 is a transparent adhesive having a thickness of between about 0.035 and 0.065 millimeters. Ideally, the adhesive coating adheres permanently to conductive layer 102, but enables tack surface 106 to be removed and repositioned on surfaces of a cellular telephone. In a preferred embodiment, the adhesive is No. 7651 adhesive available from Dow Corning Corporation of Midland, Mich., has an adhesive strength range of approximately 1.97 grams per meter (g/m) to approximately 3.94 grams per meter (g/m). Other adhesives with suitable transparent properties will also suffice.

In another embodiment, adhesive layer 103 comprises a polymer coating suitable for static adherence to the face of a cellular telephone.

Figure 2:
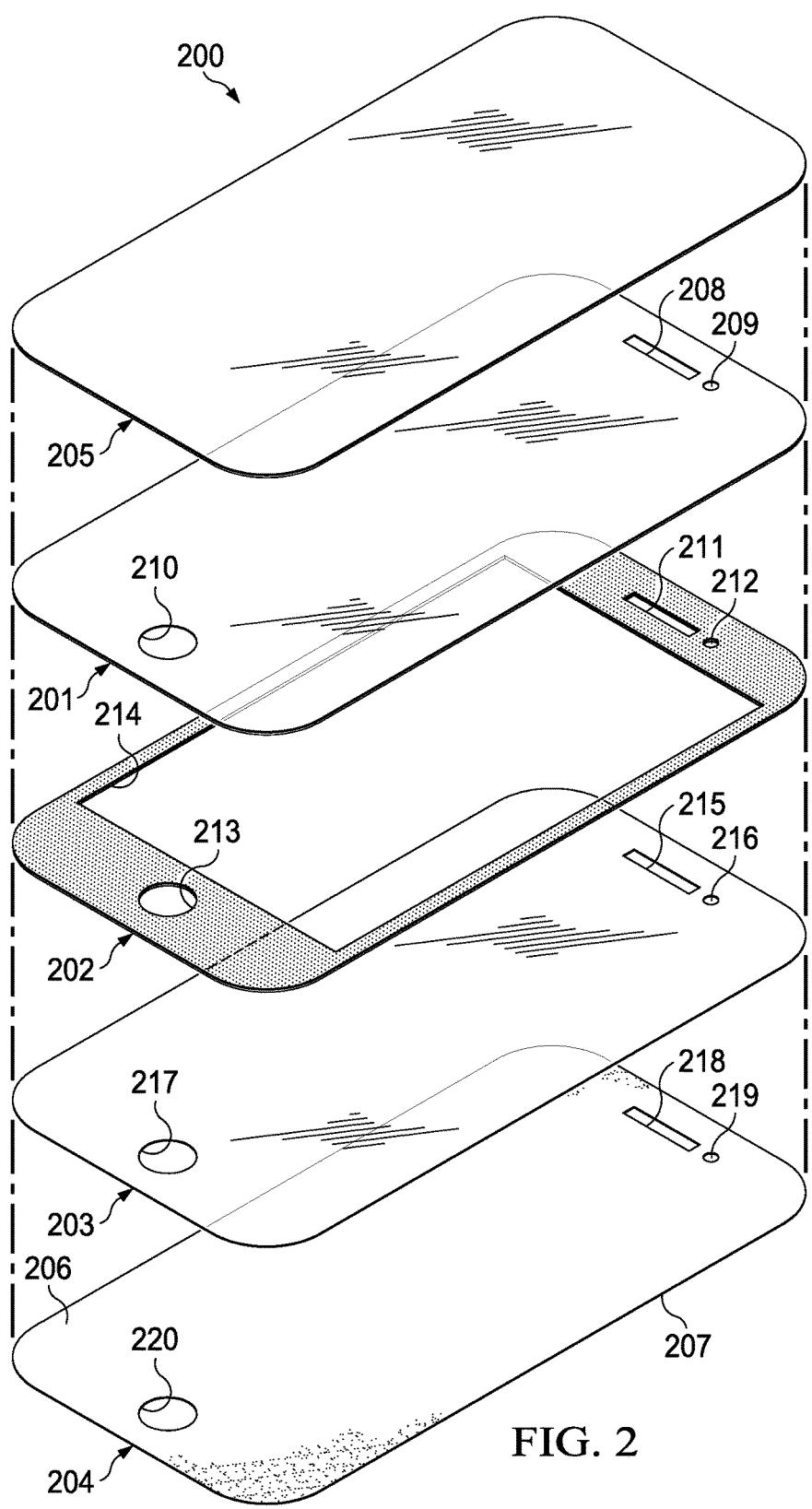
FIG. 2 is an exploded isometric view of a preferred embodiment.

Referring to FIG. 2, an alternative embodiment is shown. Radiation shield 200 comprises scratch resistant layer 205, first substrate polymer layer 201, conductive layer 202, second substrate polymer layer 203, and adhesive layer 204. First substrate polymer layer 201 has openings 208, 209, and 210. Conductive layer 202 attaches to first substrate polymer layer 201. Conductive layer 202 has openings 211, 212, and 213, and aperture 214. Second polymer layer 203 attaches to conductive layer 202. Second substrate polymer layer 203 has openings 215, 216, and 217. Adhesive layer 204 attaches to second substrate polymer layer 203. Adhesive layer 204 has attachment surface 206, tack surface 207, and openings 218, 219, and 220.

In a preferred embodiment, scratch resistant layer 205 is a magnesium fluoride coating of between about 0.01 millimeters and 0.015 millimeters, applied through vapor deposition.

In a preferred embodiment, first substrate polymer layer 201 is made of a polyester substrate having a thickness of between about 0.1 millimeters and 0.7 millimeters.

In a preferred embodiment, first substrate polymer layer 201 is comprised of polyethylene terephthalate ("PET") having a thickness of between about 0.1 mm and 0.7 mm.

In another embodiment, first substrate polymer layer 201 is made of a glass material having a thickness of between about 0.1 millimeters and 0.7 millimeters. Preferred glasses include 75% silica glass having non-metallic doping.

In another embodiment, first substrate polymer layer 201 is made of a polycarbonate material having a thickness of between about 0.1 millimeters and 0.7 millimeters. Preferred polycarbonates are LEXAN®, MAKROKOM® or MAKROCLEAN® available from Sabic Innovative Plastics and Aria Plast AB of Sweden, respectively.

In a preferred embodiment, second substrate polymer layer 203 has a thickness of between about 0.1 millimeters and 0.7 millimeters.

In a preferred embodiment, second polymer layer 203 is made of a polyester substrate having a thickness of between about 0.1 millimeters and 0.7 millimeters.

In a preferred embodiment, second substrate polymer layer 203 is comprised of polyethylene terephthalate ("PET") having a thickness of between about 0.1 mm and 0.7 mm.

In another embodiment, second substrate polymer layer 203 is made of a glass material having a thickness of between about 0.25 millimeters and 0.5 millimeters. Preferred glasses include 75% silica glass having non-metallic doping.

In another embodiment, second substrate polymer layer 203 is made of a polycarbonate material having a thickness of between about 0.1 millimeters and 0.7 millimeters. Preferred polycarbonates are LEXAN®, MAKROKOM® or MAKROCLEAN® available from Sabic Innovative Plastics and Aria Plast AB of Sweden, respectively.

In a preferred embodiment, conductive layer 202 is a metallic coating which is applied to the substrate polymer, having a thickness of between approximately 0.03 millimeters and 0.06 millimeters and a sheet resistance of between about 10 ohms per square and about 15 ohms per square. Preferred methods of manufacture include sputtering and vapor deposition of the metallic layer onto the substrate polymer. Openings 211, 212, 213 and aperture 214 do not have conductive layer 202. In a preferred embodiment, the substrate polymer is masked during application of the conductive layer to create openings 211, 212, 213 and aperture 214. In other embodiments, the conductive layer is removed after deposition by laser or chemical etching, particularly hydrochloric acid or nitric acid. Conductive layer 202 is preferably comprised of indium tin oxide having a transparency of at least 84% light transmission upon application. Other conductive materials such as silver, gold, and carbon nanotubes or graphene will also suffice. Conductive polymers can also be used with success, such as polyacetylene, polyphenylenen vinylene, polythophene and polyphylene sulfide. Similarly, conducting polymer nanofibers can be used with success, particularly polyaniline nanofibers and carbon nanofibers.

In a preferred embodiment, adhesive layer 204 is a transparent adhesive having a thickness of approximately 0.035 and 0.065 millimeters and properties that enable it to permanently adhere to second polymer layer 203 and yet enable tack surface 207 to removably attach to flat surfaces on a cellular telephone. In a preferred embodiment, the adhesive is No. 7651 adhesive available from Dow Corning Corporation of Midland, Mich., has an adhesive strength range of approximately 1.97 grams per meter (g/m) to approximately 3.94 grams per meter (g/m). Other adhesives with suitably transparent properties will also suffice.

Figure 3:
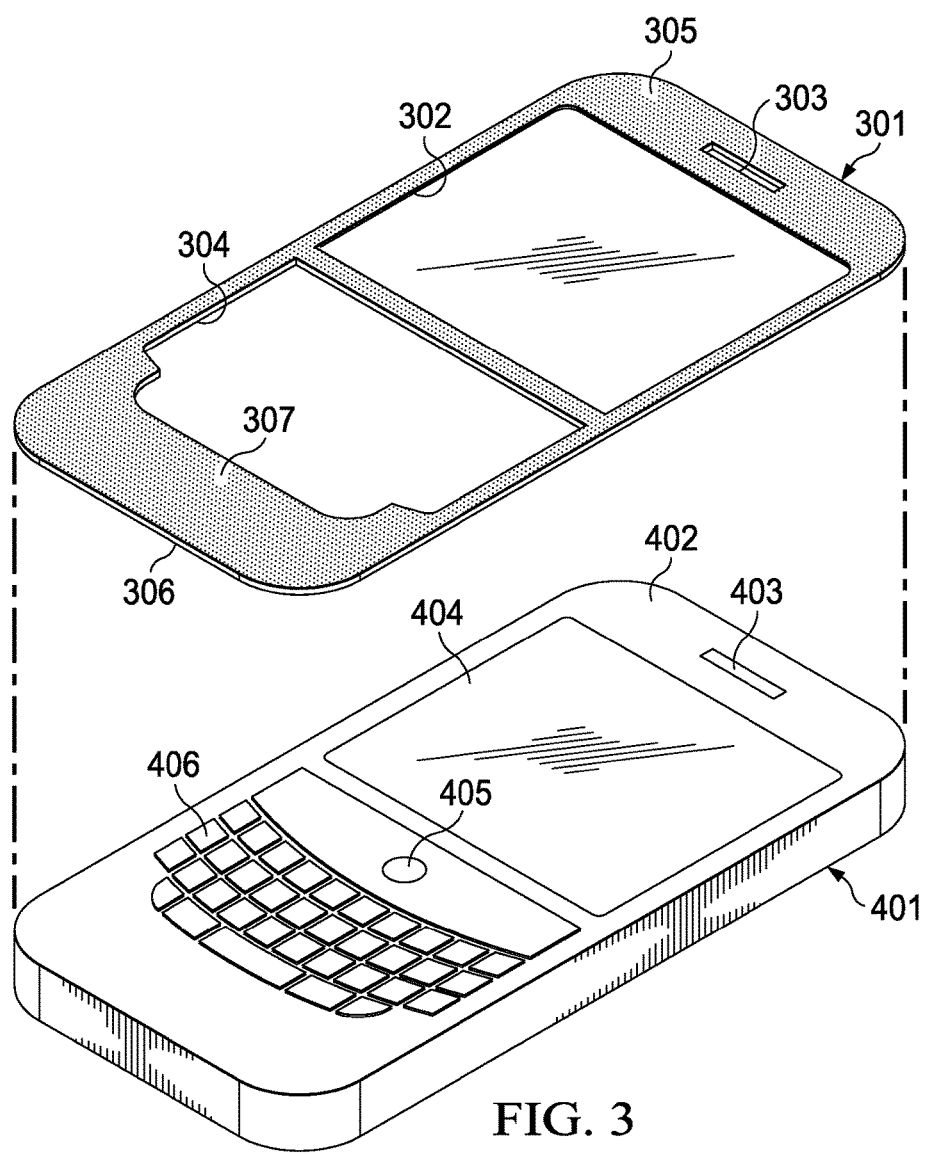
FIG. 3 is an isometric view of a preferred embodiment in use.

Referring to FIG. 3, an application of an assembled radiation shield to a cellular telephone is shown. Radiation shield 301 has aperture 302, openings 303 and 304. The shield includes exposed scratch resistant surface 305 and exposed tack surface 306. Exemplary cellular telephone 401 has front surface 402, speaker 403, screen 404, trackball 405, and keyboard 406. Opening 303 approximately matches speaker 403. Opening 304 approximately matches the dimensions of keyboard 406 and trackball 405. Aperture 302 has a set of dimensions sized to approximately match the dimensions of screen 404.

In the assembled radiation shield 301 includes aperture 302. Aperture 302 is an area of the shield where conductive layer 307 is not present. In this embodiment, openings 303 and 304 extend through radiation shield 301. Aperture 302 allows screen 404 to properly function. Aperture 302 is largely transparent due to the transparency of the substrate polycarbonate layer and the scratch resistant layer. The transparency allows transmission of the light from the screen of the cellular telephone. Opening 304 allows controls of the cellular telephone to be easily accessed. Similarly, opening 303 allows sound from the speaker to exit the phone unhindered.

In a preferred embodiment, tack surface 306 is adhered to front surface 402 by static attraction.

Figure 4:
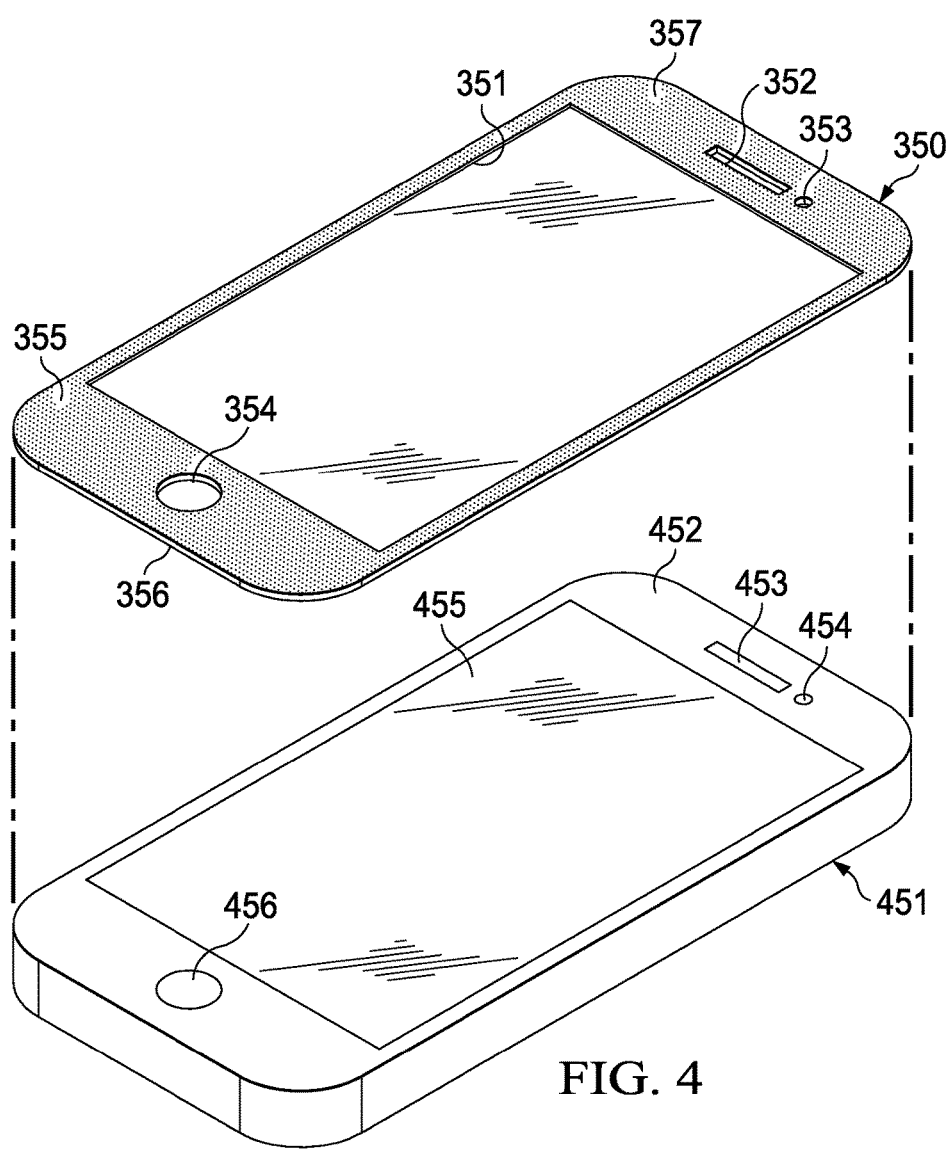
FIG. 4 is an isometric view of a preferred embodiment in use.

Referring to FIG. 4, another embodiment is shown. Radiation shield 350 includes aperture 351, openings 352, 353, and 354, scratch resistant surface 355, tack surface 356, and conductive layer 357. Cellular telephone 451 has front outside surface 452, speaker 453, camera 454, touch-sensitive screen 455, and button 456. Aperture 351 has a set of dimensions that are approximately equal to the dimensions of touch-sensitive screen 455. Opening 352 is sized to approximately match speaker 453. Opening 353 is sized to approximately match camera 454. Opening 354 is sized to approximately match button 456.

In the assembled radiation shield 350 includes aperture 351. Aperture 351 is an area of the shield where conductive layer 357 is not present. In this embodiment, openings 352, 353 and 354 extend through radiation shield 350. Aperture 351 allows touch-sensitive screen 455 to maintain touch-sensitive functionality. Aperture 351 is largely transparent due to the transparency of the substrate polycarbonate layer and the scratch resistant layer. The transparently allows transmission of the light from the screen of the cellular telephone. Opening 303 allows controls of the cellular telephone to be easily accessed. Similarly, opening 352 allows sound from the speaker to exit the phone unhindered.

In a preferred embodiment, tack surface 356 is adhered to front surface 452 by static attraction.

Figure 5:
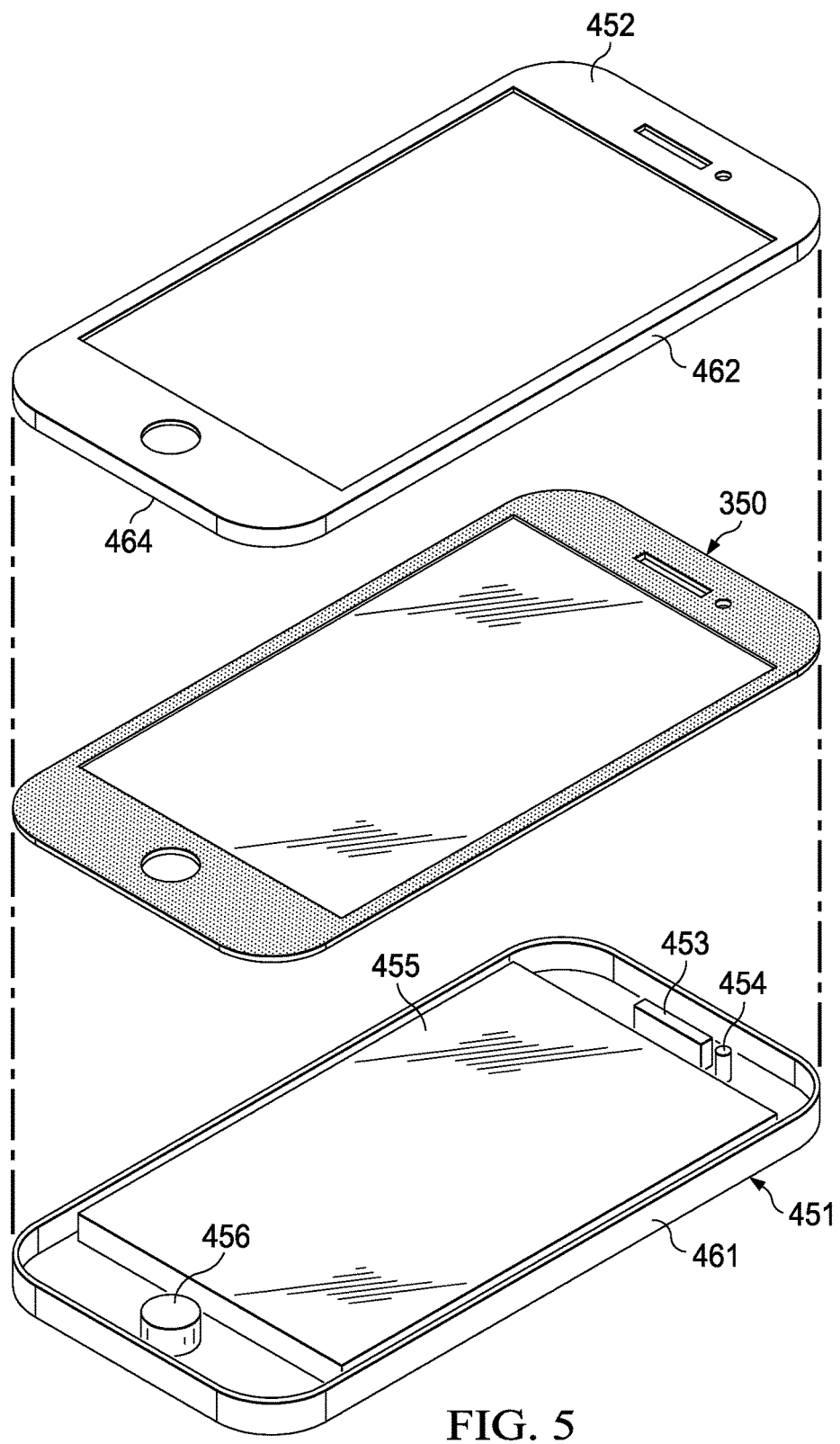
FIG. 5 is an exploded isometric view of a preferred embodiment in use.

Referring to FIG. 5, another embodiment is shown. In this embodiment, radiation shield 350 is shown positioned inside a cellular telephone assembly. In this embodiment, radiation shield 350 has the same layered construction as radiation shield 200 of FIG. 2, except radiation shield 350 does not include adhesive layer 204 or scratch resistant layer 205. Cellular telephone 451 includes base 461 and cover 462. Base 461 includes speaker 453, camera 454, screen 455, and button 456. Cover 462 includes front outside surface 452 and front inside surface 464. Radiation shield 350 is located inside cellular telephone 451 between base 461 and cover 462, and adjacent front inside surface 464.

Tests were conducted to measure the specific absorption rate produced by three cellular telephones with and without the radiation shield at a location on a simulated human head. In the following tests, the sample volume is 1 gram of tissue.

The detection system used in each test was a DASY52 dosimetric scanner manufactured and sold by Schmid & Partner Engineering AG of Zurich, Switzerland ("SPEAG") having an EX3DV3 probe attached to the DASY52 scanner. The simulated human head called a "phantom" was a SAM2 phantom manufactured and sold by SPEAG. The sensor position was swept robotically through multiple positions within the phantom to measure the electromagnetic radiation produced by the cellular telephone.

Test 1 Results

Figure 6:
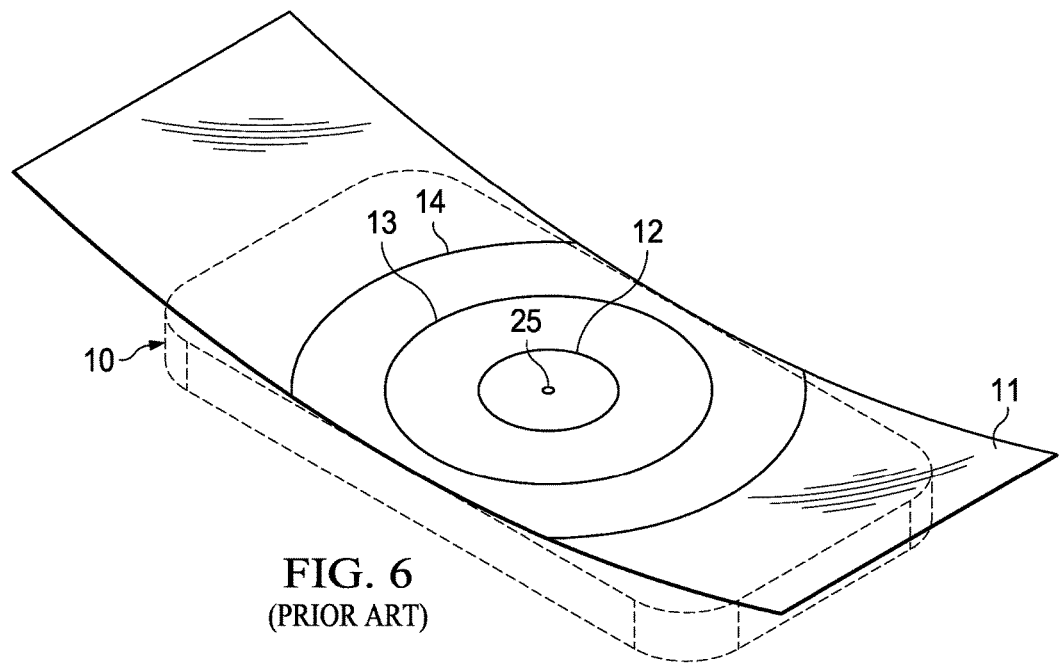
FIG. 6 is a plot of an electromagnetic radiation pattern in a curved plane produced by a cellular telephone.

FIG. 6 shows a map of radiated power as measured in the matching fluid. Cellular telephone 10 was positioned in contact with surface 11 at a perpendicular tangent at electromagnetic radiation source 25 on surface 11. Equipotential lines 12, 13, and 14 of the electromagnetic radiation are mapped on surface 11. The cellular device emitted approximately two (2) watts peak power. Equipotential lines 12, 13, and 14 have values of approximately 0.783 mW/g, 0.626 mW/g, and 0.470 mW/g, respectively. Equipotential lines 12, 13, and 14 appear as radial distances from electromagnetic radiation source 25 of approximately 1.5, 2.5, and 2.8 centimeters, respectively.

Figure 7:
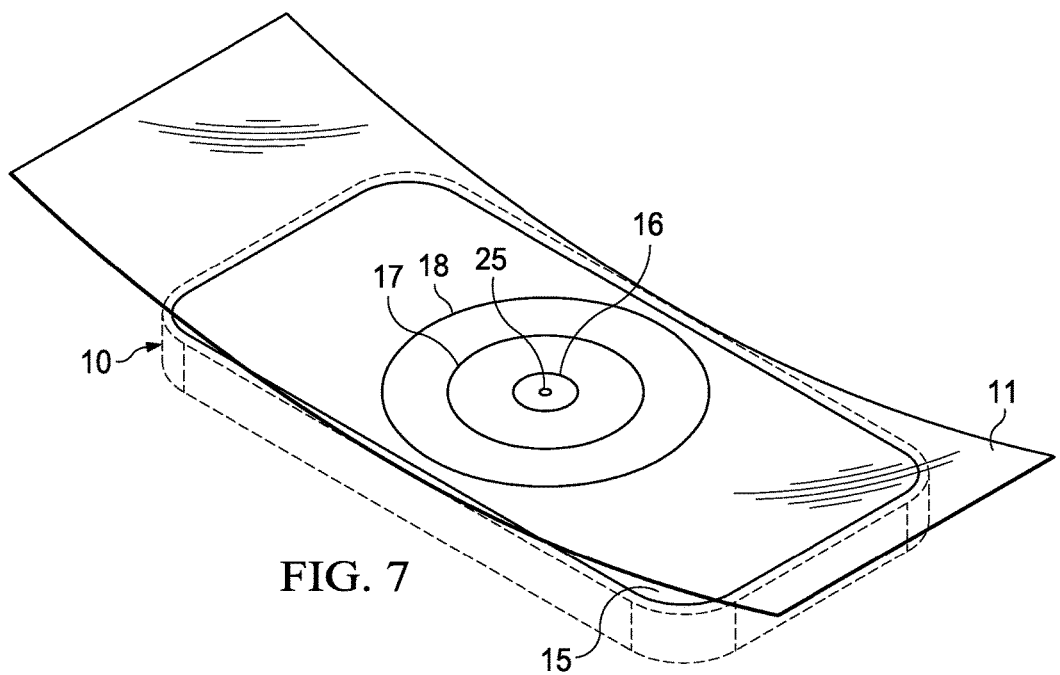
FIG. 7 is a plot of an electromagnetic radiation pattern in a curved plane produced by a cellular telephone utilizing a preferred embodiment.
Figure 8:
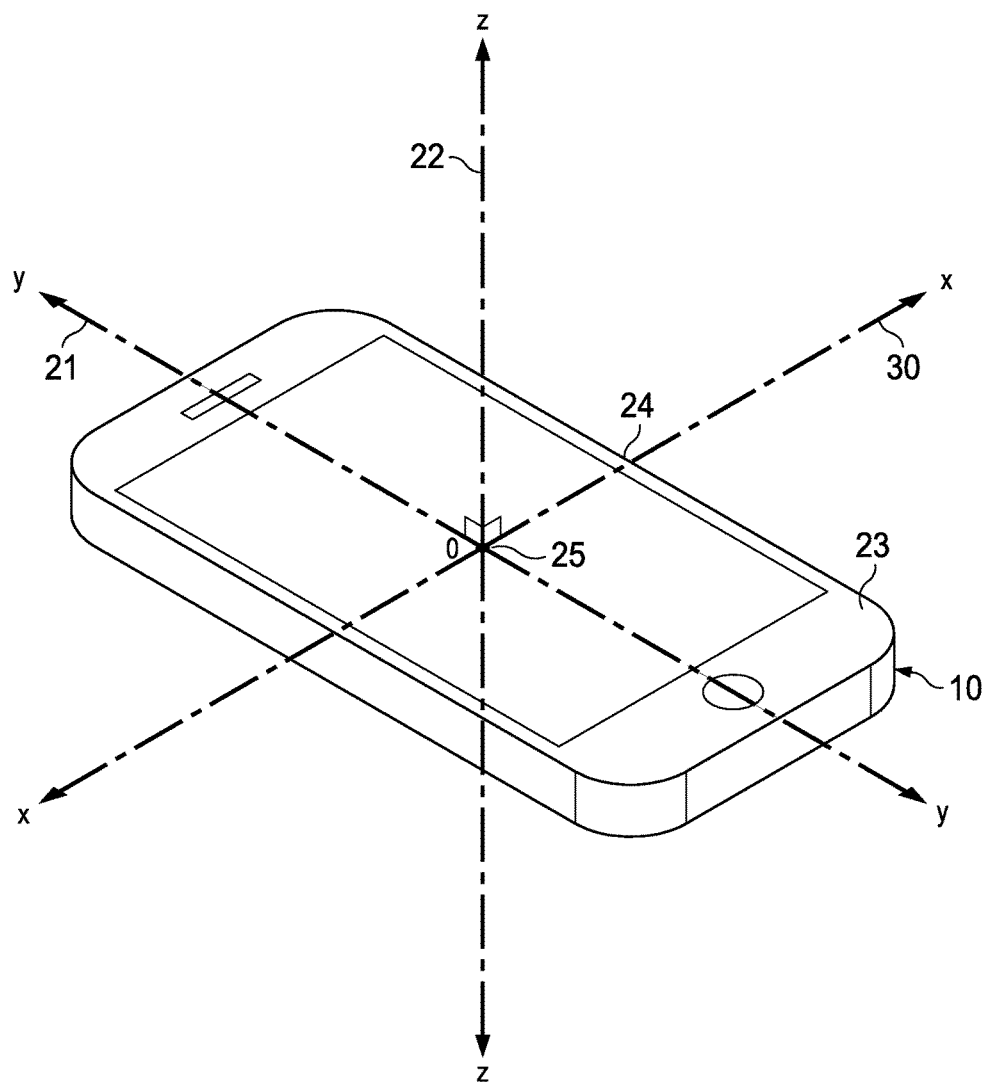
FIG. 8 is an isometric view of a cellular telephone.

Referring to FIG. 7, radiation shield 15 is shown attached to cellular telephone 10. Equipotential lines 16, 17, and 18 are mapped on surface 11 when cellular telephone with radiation shield 15 is use. Equipotential lines 16, 17, and 18 have values of approximately 0.697 mW/g, 0.559 mW/g, and 0.457 mW/g, respectively. Equipotential lines 16, 17, and 18 appear as radial distances from electromagnetic radiation source 25 of approximately 1.5, 2.8, and 3.0 centimeters, respectively.

Comparing FIGS. 6 and 7, it is seen that the radiation shield 15 attenuates the electromagnetic radiation directed toward the human head from a cellular telephone 10. Equipotential lines 16, 17, and 18 are attenuated by as much as 30% when compared to equipotential lines 12, 13, and 14 in distance. As a result, radiation levels are reduced across surface 11 thereby reducing radiation absorbed by the human tissue.

Test 2 Results

Test 2 measured the SAR level produced by the Apple® iPhone 4 cellular telephone positioned against the right-hand side of the simulated human head. Three SAR levels were tested: a baseline SAR level produced with no radiation shielding attached; a SAR level produced with radiation shield 200 attached to the phone; and a SAR level produced with a portion of the lower section removed.

The results of Test 2 are listed in Table 1 below.

TABLE 1

Apple ® iPhone 4 SAR Measurement Results

| Device | Band | Channel | Frequency (MHz) | Mode | Side of Head | SAR 1 g (W/kg) |
|---|---|---|---|---|---|---|
| iPhone 4 (baseline) | Cell | 189 | 836.60 | GSM Voice | Right | 0.823 |
| iPhone 4 with Radiation Shield | Cell | 189 | 836.60 | GSM Voice | Right | 0.134 |
| iPhone 4 with | Cell | 189 | 836.60 | GSM | Right | 0.712 |

TABLE 1-continued

Apple® iPhone 4 SAR Measurement Results

| Device | Band | Channel | Frequency (MHz) | Mode | Side of Head | SAR 1 g (W/kg) |
|---|---|---|---|---|---|---|
| Radiation Shield with lower section removed to expose cellular antenna | | | | Voice | | |

Test 3 Results

Test 3 measured the SAR level produced by the Apple® iPhone 3 cellular telephone positioned against the right-hand side ear and the left-hand side ear of the simulated human head. Eight SAR levels produced by the Apple® iPhone 3 cellular telephone were measured, with and without the radiation shield attached to the cellular telephone: four SAR levels with the cellular telephone operating in the 800 MHz band; and four SAR levels with the cellular telephone operating in the 1900 MHz PCS band. A baseline SAR level was measured from the phone with no radiation shielding attached.

The results of Test 3 are listed in Table 2 below.

TABLE 2

Apple® iPhone 3 SAR Measurement Results

| Device | Band | Channel | Frequency (MHz) | Mode | Side of Head | SAR 1 g (W/kg) |
|---|---|---|---|---|---|---|
| iPhone 3 (baseline) | Cell | 189 | 836.60 | GSM Voice | Right | 0.418 |
| iPhone 3 with Radiation Shield | Cell | 189 | 836.60 | GSM Voice | Right | 0.311 |
| iPhone 3 (baseline) | Cell | 189 | 836.60 | GSM Voice | Left | 0.371 |
| iPhone 3 with Radiation Shield | Cell | 189 | 836.60 | GSM Voice | Left | 0.314 |
| iPhone 3 (baseline) | PCS | 661 | 1880.0 | GSM Voice | Right | 1.250 |
| iPhone 3 with Radiation Shield | PCS | 661 | 1880.0 | GSM Voice | Right | 0.307 |
| iPhone 3 (baseline) | PCS | 661 | 1880.0 | GSM Voice | Left | 0.997 |
| iPhone 3 with Radiation Shield | PCS | 661 | 1880.0 | GSM Voice | Left | 0.290 |

Test 4 Results

Test 4 measured the SAR level produced by the HTC® Evo cellular telephone positioned against the right-hand side ear and the left-hand side ear of the simulated human head. Eight SAR levels produced by the phone were measured, with and without an embodiment of the radiation shield disclosed herein attached to the phone: four SAR levels with the phone operating in the 800 MHz band; and four SAR levels with the phone operating in the 1900 MHz PCS band. A baseline SAR level was measured from the phone operating with no radiation shielding attached, at each head band of operation.

The results of Test 4 are listed in Table 3 below.

TABLE 3

HTC® Evo SAR Measurement Results

| Device | Band | Channel | Frequency (MHz) | Mode | Side of Head | SAR 1 g (W/kg) |
|---|---|---|---|---|---|---|
| HTC® Evo (baseline) | Cell | 384 | 836.52 | CDMA-RC3/SO55 | Right | 0.737 |
| HTC® Evo with Radiation Shield | Cell | 384 | 836.52 | CDMA-RC3/SO55 | Right | 0.659 |
| HTC® Evo (baseline) | Cell | 384 | 836.52 | CDMA-RC3/SO55 | Left | 0.900 |
| HTC® Evo with Radiation Shield | Cell | 384 | 836.52 | CDMA-RC3/SO55 | Left | 0.816 |
| HTC® Evo (baseline) | PCS | 600 | 1880.0 | CDMA-RC3/SO55 | Right | 1.620 |
| HTC® Evo with Radiation Shield | PCS | 600 | 1880.0 | CDMA-RC3/SO55 | Right | 0.989 |
| HTC® Evo (baseline) | PCS | 600 | 1880.0 | CDMA-RC3/SO55 | Left | 1.800 |
| HTC® Evo with Radiation Shield | PCS | 600 | 1880.0 | CDMA-RC3/SO55 | Left | 1.170 |

Referring to FIGS. 8, 9A-9C, components of the electromagnetic power emitted by a cellular telephone with and without a radiation shield present are plotted x-axis 30, y-axis 21 and z-axis 22 related to a cellular phone body. Cellular telephone 10 has surface 23 and electromagnetic radiation source 25. X-axis 30 extends parallel to surface 23, through electromagnetic radiation source 25. Y-axis 21 extends parallel to surface 23, through electromagnetic radiation source 25 and parallel to height 24. Z-axis 22 extends perpendicular to both y-axis 21 and x-axis 30 and perpendicularly from surface 23 through electromagnetic radiation source 25.

Figure 9A:
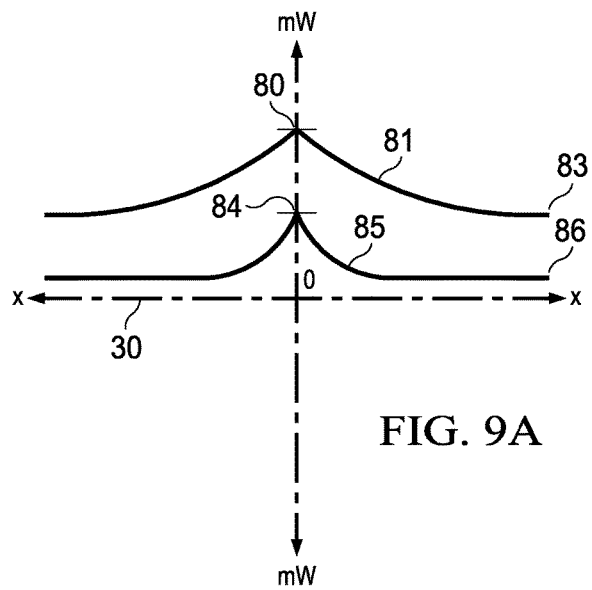
FIG. 9A is a graph of an electromagnetic radiation pattern measured from a cellular telephone and a cellular telephone utilizing a preferred embodiment along an x-axis.

Referring to FIG. 9A, curve 81 shows the power, measured in milliWatts (mW), at distances along x-axis 30 from electromagnetic radiation source 25 with no radiation shielding. Curve 85 shows the power in mW at distances along x-axis 30 from electromagnetic radiation source 25 with radiation shield 15 attached to cellular telephone 10.

Curve 85 shows the power, measured in milliWatts (mW), at distances along the x-axis from electromagnetic radiation source 25 with radiation shield 15 adhered to the surface of electromagnetic radiation source 25. The power is significantly less than the power measured with no radiation shield. Point 80 shows a peak power of approximately 0.780 mW. Point 83 shows a power of approximately 0.157 mW. Point 84 shows a peak power of approximately 0.697 mW. Point 86 shows a power of approximately 0.152 mW.

Figure 9B:
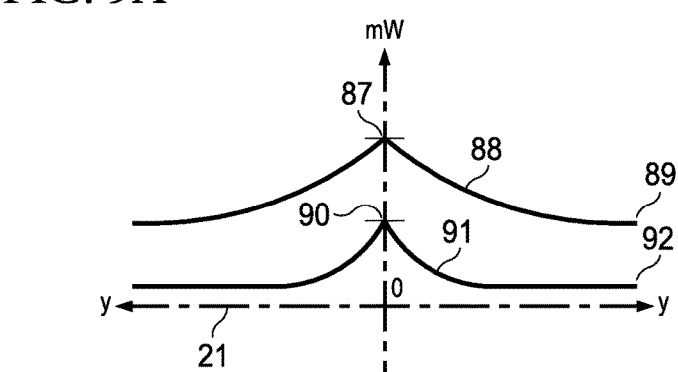
FIG. 9B is a graph of an electromagnetic radiation pattern measured from a cellular telephone of the prior art and a cellular telephone utilizing a preferred embodiment along a y-axis.

Referring to FIG. 9B, curve 88 shows the power, measured in milliWatts (mW), at distances along y-axis 21 from electromagnetic radiation source 25 with no radiation shielding. Curve 91 shows the power in mW at distances along y-axis 21 from electromagnetic radiation source 25 with radiation shield 15 attached to cellular telephone 10.

Curve 91 shows the power, measured in milliWatts (mW), at distances along the y-axis from electromagnetic radiation source 25 with radiation shield 15 adhered to the surface of electromagnetic radiation source 25. The power is significantly less than the power measured with no radiation shield. Point 87 shows a peak power of approximately 0.780 mW. Point 89 shows a power of approximately 0.157 mW. Point 90 shows a peak power of approximately 0.697 mW. Point 92 shows a power of approximately 0.152 mW.

Figure 9C:
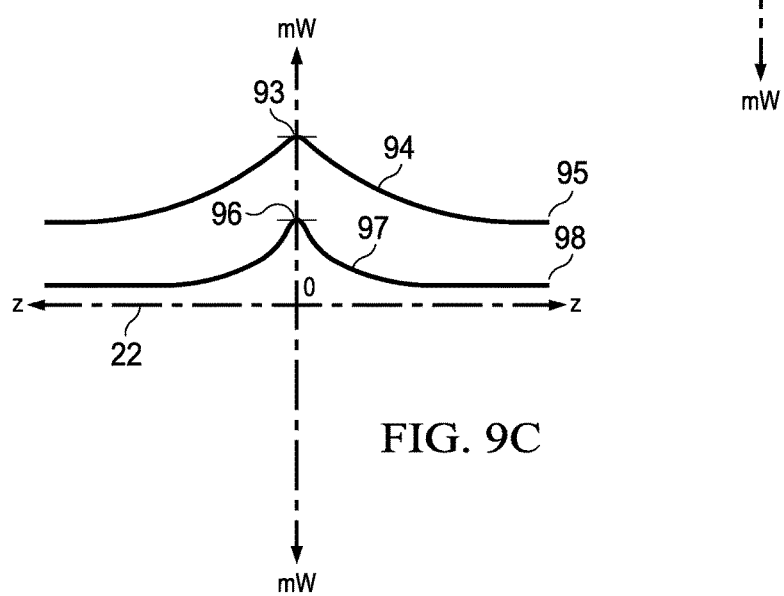
FIG. 9C is a graph of an electromagnetic radiation pattern measured from a cellular telephone of the prior art and a cellular telephone utilizing a preferred embodiment along a z-axis.

Referring to FIG. 9C, curve 94 shows the power, measured in milliWatts (mW), at distances along z-axis 22 from electromagnetic radiation source 25 with no radiation shielding. Curve 97 shows the power in mW at distances along z-axis 22 from electromagnetic radiation source 25 with radiation shield 15 attached to cellular telephone 10.

Curve 97 shows the power, measured in milliWatts (mW), at distances along the x-axis from electromagnetic radiation source 25 with radiation shield 15 adhered to the surface of electromagnetic radiation source 25. The power is significantly less than the power measured with no radiation shield. Point 93 shows a peak power of approximately 0.780 mW. Point 95 shows a power of approximately 0.157 mW. Point 96 shows a peak power of approximately 0.697 mW. Point 98 shows a power of approximately 0.152 mW.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. A radiation shield for attachment to a cellular telephone, the cellular telephone having a front face and a touch-sensitive screen, comprising:
   a first substrate polymer layer;
   a conductive layer, adjacent the first substrate polymer layer;
   a second substrate polymer layer, adjacent the conductive layer;
   an adhesion surface, adjacent the second substrate polymer layer and the front face;
   the conductive layer having an aperture that provides access to the touch-sensitive screen;
   whereby the radiation shield attenuates electromagnetic radiation.

2. The radiation shield of claim 1, wherein the cellular telephone has a set of controls and the radiation shield has at least one opening providing access to the set of controls.

3. The radiation shield of claim 1, wherein the first substrate polymer layer has a thickness range of approximately 0.1 mm to approximately 0.7 mm.

4. The radiation shield of claim 1, wherein the first substrate polymer layer is a material selected from the group of polyester, polyethylene terephthalate, glass, and polycarbonate.

5. The radiation shield of claim 1, wherein the second substrate polymer layer has a thickness range of approximately 0.1 mm to approximately 0.7 mm.

6. The radiation shield of claim 1, wherein the second substrate polymer layer is a material selected from the group of polyester, polyethylene terephthalate, glass, and polycarbonate.

7. The radiation shield of claim 1, wherein the conductive layer has a sheet resistance range of about 10 ohms per square to about 15 ohms per square.

8. The radiation shield of claim 1, wherein the conductive layer has a thickness range of approximately 0.03 mm to approximately 0.06 mm.

9. The radiation shield of claim 1, wherein the conductive layer is made of a material selected from the group of indium tin oxide, silver, gold, graphene, carbon nanotubes, polyacetylene, polyphenylenen vinylene, polythophene, polyphylene sulfide, polyaniline nanofibers, and carbon nanofibers.

10. The radiation shield of claim 1, wherein the adhesion surface further comprises an adhesive layer.

11. The radiation shield of claim 1, wherein the adhesive layer has a thickness range of approximately 0.035 mm to approximately 0.065 mm.

12. The radiation shield of claim 1, wherein the aperture is a semi-transparent region having at least 84% transparency.

13. The radiation shield of claim 1, further comprising:
   the conductive layer juxtaposed between the first substrate polymer layer and the second substrate polymer;
   the second substrate polymer layer juxtaposed between the conductive layer and the adhesion surface;
   the conductive layer formed as a metallic coating;
   a first opening that is sized to approximately match a speaker of the cellular telephone;
   a second opening that is sized to approximately match a camera of the cellular telephone;
   a third opening that is sized to approximately match a button of the cellular telephone;
   the aperture having a set of dimensions that are approximately equal to a set of dimensions of the touch-sensitive screen;
   the aperture being an area of the radiation shield where the conductive layer is not present;
   the electromagnetic radiation that is attenuated is in one of the 800 MHz band and the 1900 MHz band for cellular telephone operation;
   wherein the first substrate polymer layer has a thickness range of approximately 0.6 mm to approximately 0.7 mm; and,
   wherein the aperture is a semi-transparent region having transparency in a range from 84% to 89%.

\* \* \* \* \*